US005697485A

United States Patent [19]

Abraham et al.

[11] Patent Number: 5,697,485

[45] Date of Patent: Dec. 16, 1997

[54] PASSENGER CONVEYOR CONTROL SYSTEM HAVING DECENTRALIZED INPUTS AND OUTPUTS

[75] Inventors: Detlev Abraham, Berlin; Hans Erich Engel, Apelern; Reinhardt Henkel, Berlin; Dietmar Krüger, Rintein; Oliver Stöxen, Seelze, all of Germany

[73] Assignee: Otis Elevator Company, Farmington, Conn.

[21] Appl. No.: 574,809

[22] Filed: Dec. 19, 1995

[51] Int. Cl.[6] .......... B65G 43/00

[52] U.S. Cl. .......... 198/322; 198/323

[58] Field of Search .......... 189/322, 323, 189/330

[56] References Cited

U.S. PATENT DOCUMENTS

| | | | |
|---|---|---|---|
| 3,580,376 | 5/1971 | Loshbough | 198/323 |
| 5,083,653 | 1/1992 | Sakata et al. | 198/322 |
| 5,107,975 | 4/1992 | Iwata | 198/323 |
| 5,482,153 | 1/1996 | Abraham et al. | 198/323 |
| 5,526,256 | 6/1996 | Sakata et al. | 198/323 |

*Primary Examiner*—Joseph E. Valenza

[57] ABSTRACT

A control system for a passenger conveyor includes a plurality of junction boxes distributed throughout the conveyor and a control unit. The control unit communicates with the plurality of junction boxes through a serial link that interconnects the junction boxes and control unit. In a particular embodiment, the control unit is located remotely from the truss of the conveyor.

4 Claims, 2 Drawing Sheets

PASSENGER CONVEYOR CONTROL SYSTEM HAVING DECENTRALIZED INPUTS AND OUTPUTS

TECHNICAL FIELD

The present invention relates to passenger conveyors, and more particularly to control systems for such passenger conveyors.

BACKGROUND OF THE INVENTION

A typical passenger conveyor, such as an escalator or moving walk, includes a truss, a plurality of sequentially connected treadplates traveling through a closed loop path within the truss, and a machine for driving the treadplates. The machine is located in a space under the one of the landings.

Control systems for such conveyors have become increasingly complex. Modem escalators and moving walks include devices such as sensors for monitoring speed, sensors for detecting missing treadplates, devices for monitoring wear; actuators for utilizing special purpose devices, such as steps to accommodate wheelchairs; and output devices, such as traffic lights. Each of these devices includes a combination of interface devices, i.e., sensors or actuators, that are connected to a central control unit.

As the number of interface devices has increased, the size and complexity of the control unit has increased. The size of the control unit presents problems because it is located in the machine space and typically must be removed in order to service the passenger conveyor. The complexity of the control unit presents further problems because as more interface devices become available, it is desirable to back-fit them onto existing passenger conveyors. Modifying existing passenger conveyors to take advantage of new interface devices requires a new control unit to replace the old one and additional wiring connections to be made between the interface device and the control unit. The cost associated with such modifications may become prohibitive.

The above art notwithstanding, scientists and engineers under the direction of Applicant's Assignee are working to develop control systems for passenger conveyors that are both flexible and cost effective.

DISCLOSURE OF THE INVENTION

According to the present invention, a control system for a passenger conveyor includes a plurality of junction boxes, each having one or more input/output (I/O) modules, and a control unit. The I/O modules communicate with the various types of interface devices, e.g., sensors, actuators, etc. The plurality of I/O modules communicate with the control unit via a serial link connected to a bus master within the control unit.

Decentralizing the I/O modules results in maximizing the flexibility of the control system. Since each interface unit has its own I/O module, new interface devices may be added, or obsolete interface devices may be removed, without having to replace the control unit. In addition, the cost associated with installing and with modifying the control system of the passenger conveyor is minimized as a result of using a serial link to provide communication between the control unit and the interface devices. Having a single, serial link requires less installation time and less material cost than the previous configurations that require each interface device to be individually wired into the control unit. Modifications of the control system can be accomplished more expeditiously and cost effectively. Any additional interface devices require only a simple connection into the serial link rather than installation of additional wiring through the limited workspace within the truss. As a further advantage, the size of the control unit is minimized because of the distribution of the I/O modules throughout the passenger conveyor.

In a particular embodiment of the present invention, the control unit including bus master is located remotely from the truss of the passenger conveyor. This feature removes the control unit from the machine space under the landing, thereby increasing the available space within the machine space in which to perform maintenance. In prior configurations, the control unit because of its size and location would have to be removed in order to conduct maintenance and repairs within the machine space. Handling the control unit during maintenance and repair increased the cost associated with conducting the maintenance and repair and also increased the likelihood of damage occurring to the control unit during the conduct of such services.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
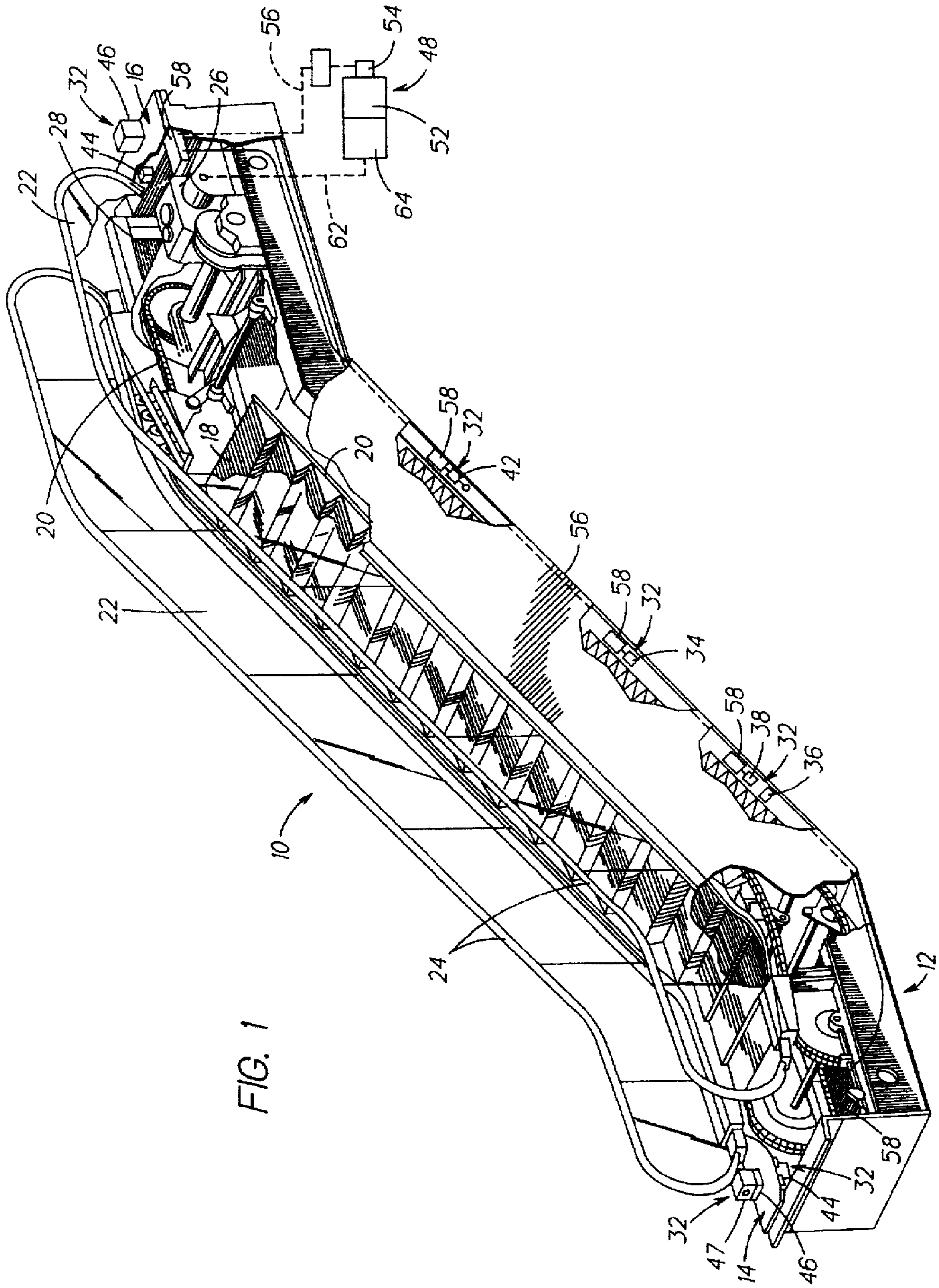
FIG. 1 is a perspective view, partially cut away, of an escalator.

FIG. 1 shows an escalator 10 as an exemplary embodiment of a passenger conveyor and is used to describe the present invention. It should become apparent in the ensuing description that the invention is applicable to other passenger conveyors, such as moving walks. The escalator 10 includes a truss 12 extending between a lower landing 14 and an upper landing 16, a plurality of sequentially connected treadplates 18 connected to a step chain 20 and traveling through a closed loop path within the truss 12, a pair of balustrades 22 having handrails 24, and a machine 26 for driving the treadplates 18 and handrails 24. The machine 26 is located in a machine space 28 under the upper landing 16.

The escalator 10 includes a plurality of operational devices 32 distributed throughout the truss 12. Among the devices 32 are the following sensors: a speed sensor 34 for the treadplates 18, a sensor 36 to detect missing treadplates 18, a limit switch 38 to detect excessive wear of the step chain 20 and treadplates 18, and a sensor 42 to monitor the speed of the handrails 24. Also among the devices 32 are the following actuators: a pair of switches 44 one in each landing 14,16, to detect the presence of a passenger and to trigger a change in speed of the escalator 10, and a pair of switches 46, also in each landing 14,16, to actuate the operation of a wheelchair platform embedded into the treadplates 18. In addition, there are output devices, such as a traffic light 47 indicating direction of travel.

Figure 2:
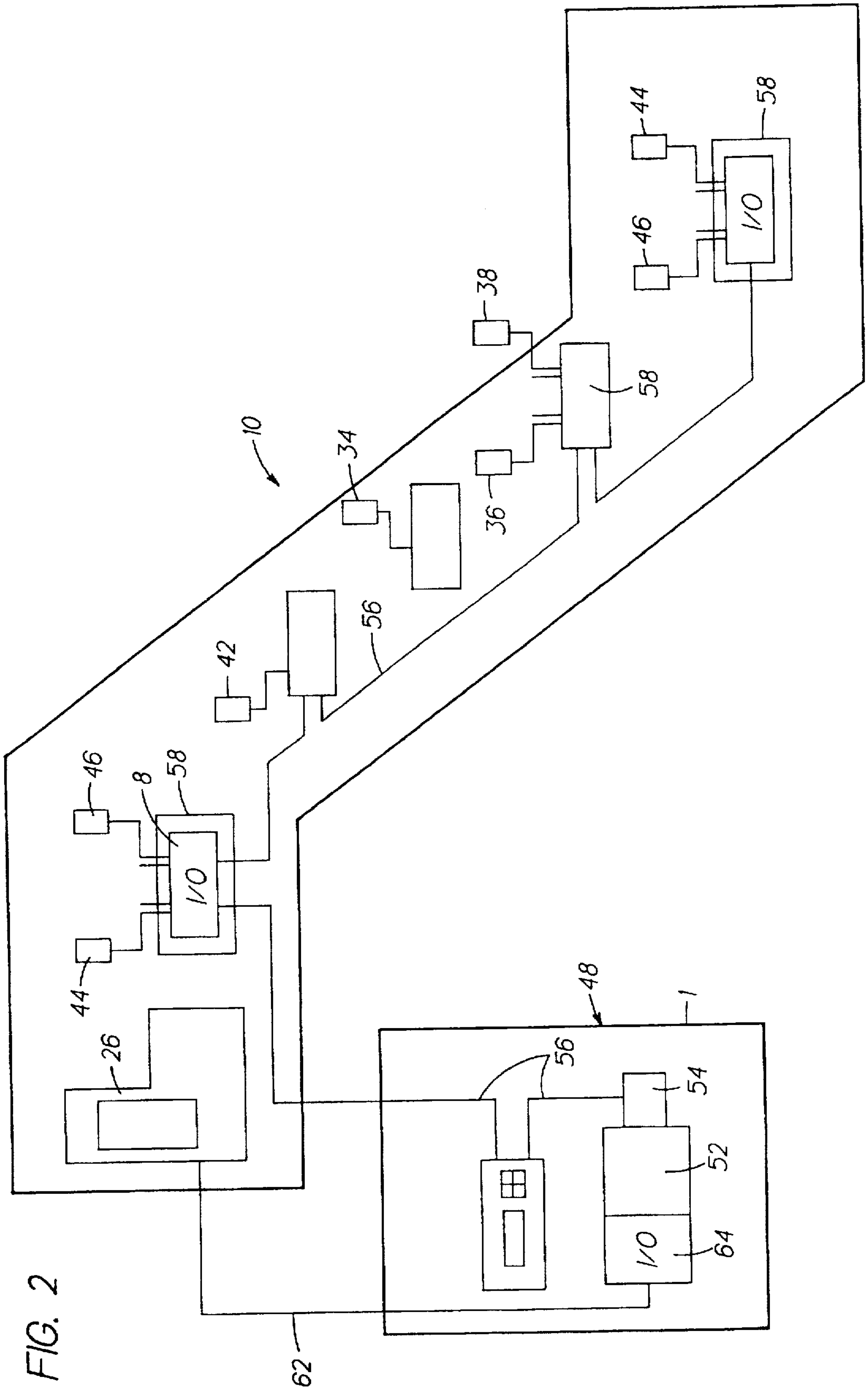
FIG. 2 is a schematic view illustrating a control system for the escalator.

A control system 48 is in communication with each of these operational devices 32 and includes a control unit 52, a bus meter 54, a serial link 56, a plurality of junction boxes 58 and a machine communication link 62. The control system 48 is represented schematically in FIG. 2.

Each of the junction boxes 58 is disposed proximate to the operational device 32 to which it is connected. For the switches 44,46 and the traffic light 47, the junction boxes 58 are located in the upper and lower landings 14, 16. For the sensors 34,36,38, the junction boxes 58 are distributed throughout the truss 12, dependent upon the location of the applicable sensor. All of the junction boxes 58 are interconnected for communication with the control unit 52. Each junction box 58 includes an input/output (I/O) module which is a conventional printed circuit board. The I/O module translates the signals from the sensors 34,36,38 into signals that can be communicated to the control unit 52, and conversely translates signals from the control unit 52 into signals that can be communicated to the actuators 44,46 and to the machine 26. Although described as junction boxes 58, it should be noted that the junction boxes 58 may also include additional functionality such that the junction box and applicable sensor/actuator may define a subsystem within the control system 48.

The serial link 56 is a simple conduit for serial transmission of signals from the junction boxes 58 to the control unit 52. The serial link 56 cyclically transfers the signals from each of the junction boxes 58 to the bus master 54 of the control unit 52. The bus master 54 accepts the transmissions over the serial link 56 and processes them directly to the control unit 52. As an alternative embodiment, the bus meter and cyclic transfer of signals may be replaced by a system whereupon signals are transmitted only upon a change in condition.

The control unit 52 incorporates the control logic for operation of the escalator 10. Signals representing the operational condition of the escalator 10 are continuously received from the bus master 54 and monitored by the control unit 52. Ira signal received indicates that there is a change in operational condition, the control unit 52 can communicate through its own I/O module 64 to the appropriate device of the escalator. For example, if the direction of travel is in the up direction, an appropriate signal will be output to the traffic light. On the other hand, if the escalator 10 is operating in an idle mode and the switch 38 detects the presence of a passenger, the control unit 52 can actuate the machine 26 to accelerate to an operational speed.

As shown in FIG. 1, the control unit 52 is located remotely from the truss 12. This location is facilitated by the flexibility of the control system 48 and provides the benefit of removing the control unit 52 from within the upper landing 16. Removing the control unit 52 increases the space available for other escalator 10 components and for the conduct of necessary maintenance. In addition, unnecessary handling of the control unit 52 is no longer required in order to perform such maintenance within the landing 16.

Installation of the escalator 10 is less labor intensive and time consuming since there is no longer a need to directly wire each sensor and actuator into the control unit 52. Upgrades and modifications of the control system 48 are also facilitated by the invention. The addition of new sensors and actuators requires only the installation of the sensor or actuator and a junction box. Since the serial link 56 is already present, a modification only requires connection of the new junction box into the serial link 56 and corresponding changes in the control unit 52 to accommodate the modification.

Although the invention has been shown and described with respect to exemplary embodiments thereof, it should be understood by those skilled in the art that various changes, omissions, and additions may be made thereto, without departing from the spirit and scope of the invention.

What is claimed is:

1. A control system for a passenger conveyor, the passenger conveyor including a truss, passenger carrying means disposed within the truss, means for driving the passenger carrying means disposed within the truss and engaged with the passenger carrying means, a plurality of operational interface devices, and the control system, wherein the control system includes:

a plurality of junction boxes, each junction box having at least one input/output (I/O) module, each I/O module in communication with one or more of the plurality of operational interface devices;

a control unit in communication with the driving means of the passenger conveyor, the control unit including a bus master;

a link for providing serial communication between the plurality of I/O modules and the control unit.

2. The control system according to claim 1, wherein the control unit is located remotely from the truss.

3. The control system according to claim 1, wherein the passenger conveyor includes a pair of landings disposed on opposite ends of the passenger conveyor, and wherein one of the plurality of junction boxes in located in the first landing of the passenger conveyor and another of the plurality of junction boxes is located in the opposite landing of the passenger conveyor.

4. The control system according to claim 1, further including a subsystem having an I/O module and an operational interface, the operational interface device being in communication with the I/O module of the subsystem, and wherein the subsystem I/O module is in communication with the bus master through the serial link.

* * * * *